United States Patent [19]

Mehnert

[11] 4,050,262
[45] Sept. 27, 1977

[54] APPARATUS FOR EXTRACTING WATER FROM THE ATMOSPHERE

[75] Inventor: Walter Mehnert, Ottobrunn, Germany

[73] Assignee: Firma "Technico Development and Financing S. A.", Fribourg, Switzerland

[21] Appl. No.: 708,875

[22] Filed: July 26, 1976

[30] Foreign Application Priority Data

Aug. 9, 1975 Germany .............................. 2535668

[51] Int. Cl.² ............................................. F25D 17/06
[52] U.S. Cl. ......................................... 62/160; 62/93; 203/26
[58] Field of Search ................... 62/93, 160, 191, 324, 62/278; 203/24, 26, 49

[56] References Cited

U.S. PATENT DOCUMENTS

| | | | |
|---|---|---|---|
| 2,283,085 | 5/1942 | Newton | 62/93 |
| 3,299,651 | 1/1967 | McGrath | 62/238 |
| 3,329,583 | 7/1967 | Othmer | 203/10 |
| 3,820,349 | 6/1974 | Styron et al. | 62/324 |
| 3,938,352 | 2/1976 | Schmidt | 62/324 |

*Primary Examiner*—William E. Wayner
*Assistant Examiner*—Robert Charvat
*Attorney, Agent, or Firm*—W. G. Fasse; W. W. Roberts

[57] ABSTRACT

An apparatus for extracting water from the atmosphere has a chamber or a pair of chambers connected to a compressor by a valve controlled in its operation in response to an operating condition in the chamber or chambers. A suction fan is connected to the chamber or chambers to move air through the chambers. A further valve is arranged in the respective inlet to the chamber or chambers to facilitate an expansion condition or effect in the respective chamber. Where two chambers are used they operate in alternate fashion so that heat is supplied to one chamber while heat is being withdrawn from the other chamber and vice versa, and both chambers are controlled in response to the respective operating condition therein.

10 Claims, 3 Drawing Figures

APPARATUS FOR EXTRACTING WATER FROM THE ATMOSPHERE

BACKGROUND OF THE INVENTION

The present invention relates to an apparatus for extracting water from the atmosphere by using a heat pump.

Water extracting devices are known in many different modifications, for example, as so called dehumidifiers. Moreover, devices are known which are used in extracting fresh water from the ocean, whereby the heretofore used methods employ the principle of expansion evaporation.

German patent publications Nos. 1,717,080 and 1,717,081 describe expansion evaporation methods for extracting fresh water from watery solutions, whereby a so called multiple expansion evaporation is used. Such evaporators comprise a row of expansion stages operating with successively lower temperatures. Bridges are arranged between the stages. The hot solution is cooled down on the evaporator side from step-to-step and successively through expansion evaporation, whereupon it is supplied to the condensation side where a heat exchange will occur.

Another method is described in German patent publication No. 2,236,519. In this apparatus the raw water which has been preheated in the condensors of the expansion evaporator is supplied to a flow-through vaporizer where it is partly vaporized and then the vapor or steam is brought to a higher temperature level by means of a heat pump to serve as a heating medium for the flow-through vaporizer, wherein the heat is given off and the distillate is supplied to the expansion evaporator.

All of the above discussed prior art methods operate according to the principle of expansion vaporization. Nevertheless these methods require an aqueous solution for recovering water. As a result, it is necessary that such prior art devices are constructed as stationary plans and it is not possible to make them portable, especially due to the weight of the entire plant structure, which is relatively expensive and technically involved.

German patent publication No. 2,112,362 discloses an arrangement of several heat pump circuits arranged in series with each other. In this known apparatus the environmental heat is brought to a higher temperature in stages, whereby each following heat pump stage uses for its starting base the hot side of the next lower heat pump stage. Although this arrangement employs air, among other media, for the coupling of the individual heat pumps, no water is extracted from such air when it is used.

OBJECTS OF THE INVENTION

In view of the above, it is the aim of the invention to achieve the following objects singly or in combination:

to provide an apparatus for the extraction of water from the atmosphere which avoids the above drawbacks, specifically which may be portable or at least mobile;

to construct the water extraction apparatus in such a manner that it may be operated by a minimum of power, for example, by a miniature internal combustion engine, or even by a hand crank;

to add to the water recovered from the atmosphere components which make the distilled water more suitable for human consumption, for example, by the addition of minerals and/or vitamins; and to construct the entire apparatus as an integral backpack, which may be conveniently carried by one person on his back.

SUMMARY OF THE INVENTION

According to the invention there is provided an apparatus for the extraction of water from the atmosphere, wherein a heat pump driven either by means of a prime mover or by hand, cooperates with one or two chamber systems through a valve. In the instance where one chamber is used, the chamber is connected to the heat extraction side of the heat pump. Where two chambers are used these chambers are alternately connected through a multi-way valve to the heat extraction side of the heat pump. In other words, when one chamber is connected to the heat extraction side of the heat pump, the other chamber is connected to the heating side of the heat pump and vice versa. The heat pump may operate by freezing, as well as by condensation, whereby the chamber systems generally are connected to the low pressure side of the heat pump. Each chamber system is provided with a suction fan or with a compressor. The heat pump operating in accordance with the freezing effect is alternately switched at the respective chamber system from heat extraction to heating and vice versa, by means of the above mentioned multi-way valve or by means of an externally energized electronic control mechanism. The just mentioned combination of features has the advantage that in a simple manner an apparatus is provided which sucks in the air of its environment to expand and cool the air whereby the latter releases its humidity at the strongly cooled surface of the vaporizer plates in said chambers, said plates being cooled by the heat pump. The operation is such that depending on an operating characteristic in the evaporation chamber, a switch-over takes place from evaporation to liquification and vice versa. This switch-over may, for example, be responsive to the thickness of a layer of ice on the vaporizer plates or to the liquid level in the above mentioned chambers. Where two chambers are employed an alternating switch-over between vaporization and liquification is performed. During the melting or rather during the extraction no fresh air is supplied to the respective chamber until the respective removal of condensate is completed. The structural features for this type of operation may easily be compacted into an integral portable structure without any technical difficulties. Thus, the invention has the advantage that it is useful in connection with special missions in desert or tropical regions, or on boats to provide an adequate supply of drinking water. Of course, the output will depend on the prevailing humidity in the atmosphere.

According to a further embodiment of the invention sensing means, such as a measuring device is arranged at the vaporizer plates of the heat pump which measures the thickness of the layer of ice on these plates or which responds to a predetermined liquid level in these chambers in order to control the multi-way valve through an electronic control device. In the simplest embodiment, a float responsive to the liquid level in the chambers may activate a switch which in turn energizes an electronic amplifer, the output of which operates a solenoid or relay for operating the multi-way valve between the heat pump proper and the above mentioned chamber or chambers. Where two chambers are employed, each chamber may perform a dual function, thus increasing the output, as well as the efficiency of the apparatus and assuring a continuous supply of water, because when one side or chamber is defrosting so to speak, the other is extracting water from the atmosphere, and vice versa.

As mentioned, the motor may be one of the well known miniature internal combustion engines having a weight of less than 400 grams sufficient to provide the power required for operating the compressor. An electromotor with the respective source of power, such as a battery or a fuel cell may also be feasible. In an emergency a hand operable crank may even be employed. The motor also drives the fans.

Filter means and water treatment elements may be arranged in the connecting conduit extending between the extraction chambers proper and a water collecting trough or the like.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
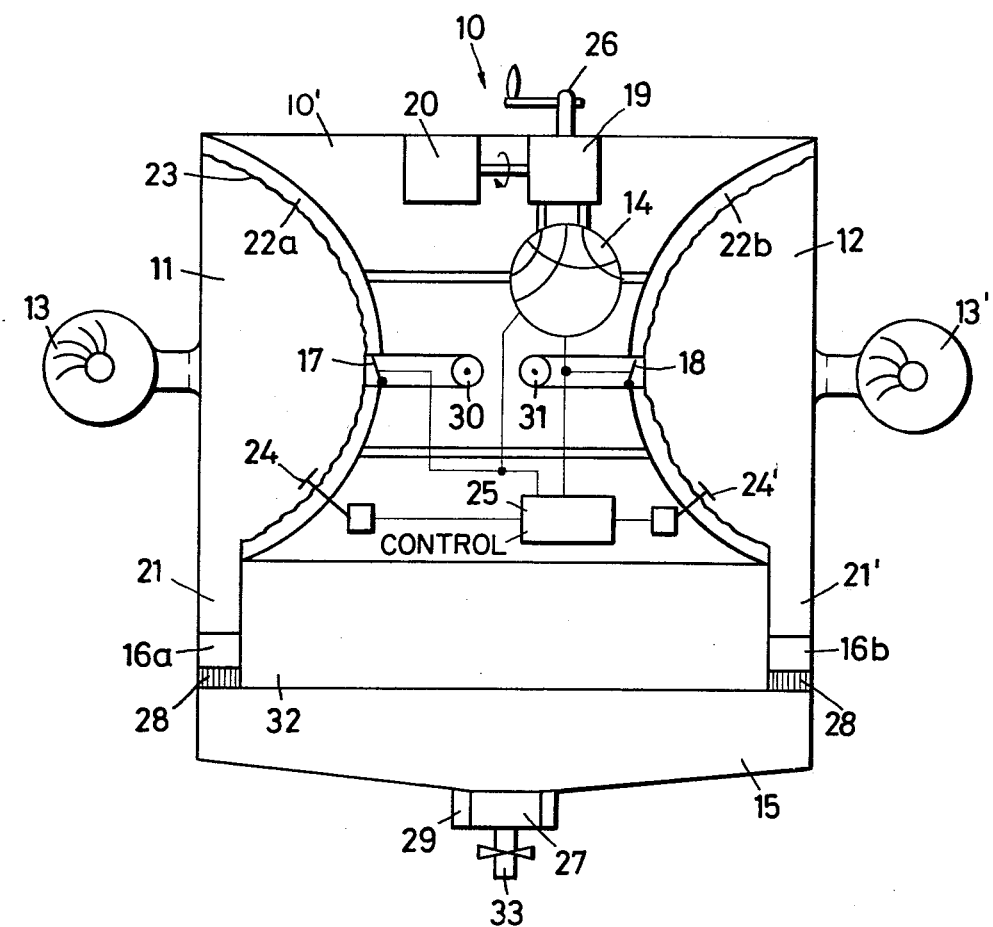
FIG. 1 illustrates a somewhat simplified schematic diagram of the present apparatus.

FIG. 1 illustrates in a schematic manner the apparatus according to the invention. A heat pump 10 has a compact housing 10′, which also holds all other components of the compact structure. A compressor 19 is driven by a motor 20, such as a miniature internal combustion engine. In an emergency the compressor 19 may also be driven by a hand crank 26. Two evaporation and liquification chambers 11 and 12 are located in the housing 10′. A multi-way valve 14 is connected between the outputs of the compressor 19 and the chambers 11 and 12. Air inlet ports 30 and 31 are connected through respective ducts to the corresponding chambers 11 and 12. Valve means, such as throttle flaps 17 and 18 are arranged in the respective ducts.

Each chamber 11, 12 is connected to its respective exhaust fan 13, 13′. When the respective valve flaps 17 or 18 are closed, it is possible to establish reduced pressure in the respective chambers 11, 12, by the operation of the exhaust fans, thereby providing an expansion effect in these chambers. This will be described in more detail below.

Each chamber 11, 12 has at least one wall with evaporating plates 22a, 22b. These evaporation or reaction plates 22a, 22b should have as large a surface area as technically possible. An effective enlargement of the surface area may be accomplished by corrugations 23 to form ribs and valleys on the evaporation plates 22a, 22b.

Each chamber is also provided at the lower end thereof with a water withdrawing means, such as a channel 20, 21′. These channels connect the chambers proper with a collecting trough 15. At the deepest point of the collecting point 15 there is provided, in a preferred embodiment of the invention, a container 27 which may hold minerals and/or vitamins 29 for improving the quality of the water produced for human consumption. The water is withdrawn through a tap valve 33 or the like. The container 27 may have predetermined size to operate as a dosing means for the minerals and/or vitamins. Thus, the quantity of additives to be combined with the water may be determined by the size of the container 27, which would be related to a specified quantity of water. When that quantity of water has been produced, the container 27 would be refilled with the additives.

Each of the evaporation and cooling plates 22a, 22b cooperates with a sensing device 24, 24′ respectively. The sensing means may respond, for example, to the thickness of the ice build up on the plates 22a, 22b. In another embodiment of the sensing means may respond to the water level in the channels 21, 21′. A simple float would be used in that instance as the sensing means. The sensors 24, 24′ which respond to the thickness of the ice build up on the plates 22a, 22b, may be simple mechanical sensors connected to close or open a switch or the like for energizing or deenergizing the electronic control 25. In the simplest embodiment, the electronic control 25 may comprise amplifiers responsive to the actuation of said switch by the respective sensor 24 or 24′ to provide output signals for operating the valves 14, 17, and 18 for example through a solenoid wellknown in the art. Assuming that the sensor 24 in the chamber 11 has sensed a sufficient ice build-up a signal will be provided to the control 25 which in turn switches the multi-way valve 14, for example, also through a solenoid, so that the chamber 11 which was being cooled is switched over to being heated and the chamber 12, which was being heated is switched over to being cooled. Simultaneously, the valve 17 is being closed to prevent further air circulation through the chamber 11, while simultaneously the valve 18 is being opened to circulate air through the chamber 12, which is now being cooled. As mentioned, the electronic control 25 may also, or in the alternative be responsive to a float in the channels 21 responding to a certain liquid level in these channels 21, 21′.

The operation of the present apparatus will now be described in more detail with reference to FIG. 2, which shows a plurality of wave forms A to K. Wave form K indicates when the heat pump 19 is started and when it is stopped again. It is assumed that at the beginning of an operating cycle the valve 14 connects the cooling side of the compressor 19 to the chamber 11 and the heating side of the compressor 19 to the chamber 12. Thus, during the time period I1 the chamber 11 is cooling, simultaneously the valve 17 is open during the period E1 and the fan 13 transports environmental air through the chamber 11 during the simultaneous time period G1. During this time period and during a slight additional time, as indicated by F1 the valve 18 is closed and the fan 13′ is stopped, as indicated by H1. Further, during the time period J1 the chamber 12 is being heated to reduce the ice build-up in this chamber.

Figure 2:
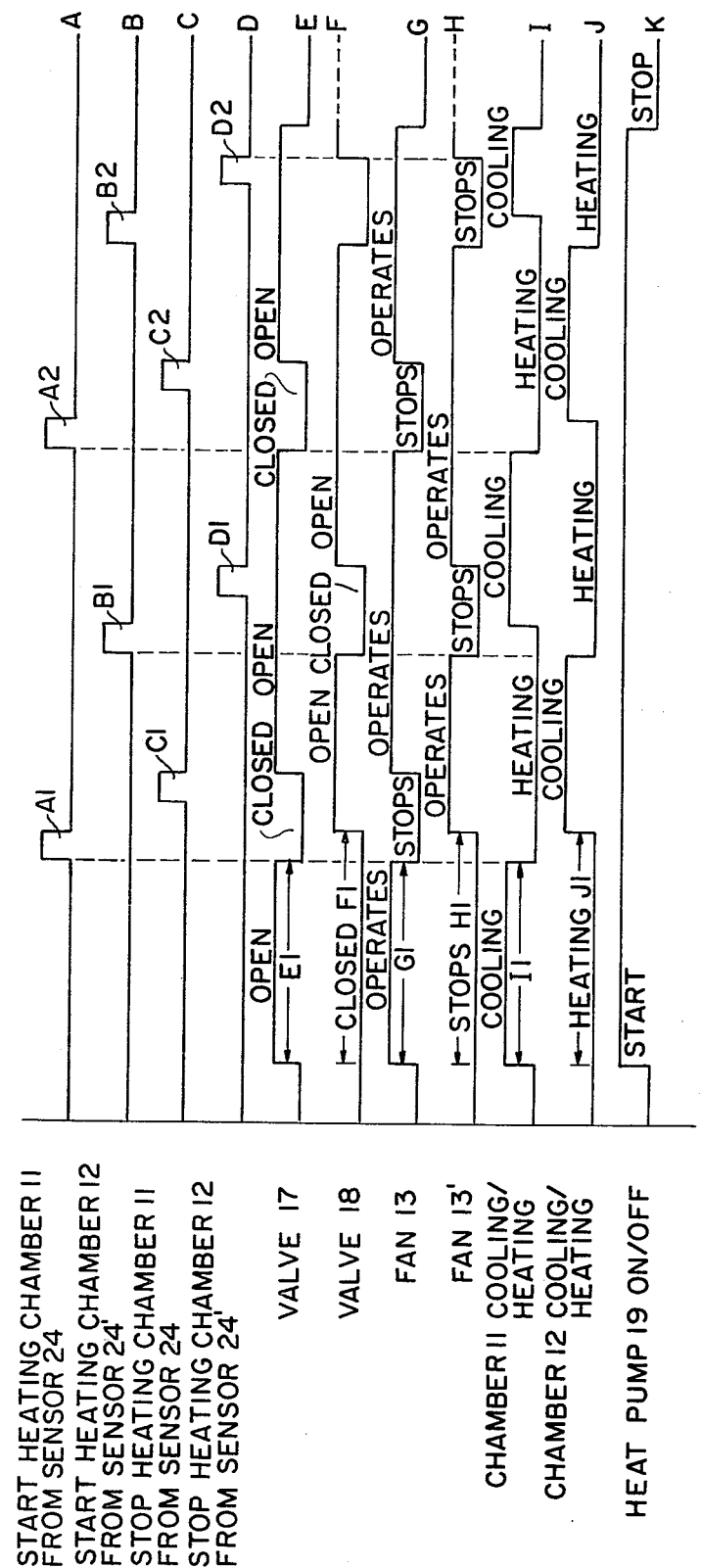
FIG. 2 is a wave-form diagram for describing the operation of the present apparatus.

Referring further to FIG. 2, when the sensor 24′ in the chamber 12 registers a sufficient ice build-up the signal B1 will be generated to start the heating of the chamber 12. Meanwhile, the sensor 24 produced the signal C1 in response to a reduction in the ice build-up to chamber 11. To blow the heat produced in chamber 11 during the cooling cycle of chamber 12 away from the apparatus the signal C1 with its trailing edge opens the valve 17 and starts the fan 13. However, the heating of the chamber 11 still continues after the valve 14 has been switched over by the signal B1. A similar preparation of the chamber 12 for the next cooling cycle is accomplished by the signal D1, which is produced when the sensor 24' registers a sufficient reduction in the ice build-up in the chamber 12. From the foregoing the operation may be summarized that a seesaw type function is accomplished with the two chambers, whereby a switch-over from heating to cooling and vice versa is preceded by a preparation residing in the opening and closing of the valve 17, 18 and in the starting and stopping of the fans 13, 13'.

The motor 20 for the compressor 19 and the fans 13, 13' may, for example, be a miniature internal combustion engine. A fuel tank 32 for such an engine may form an integral part of the entire structure. Such miniature internal combustion engines are well known in the art and normally have a weight of approximately 400 grams, thereby achieving a power output of about 1.2 to 1.8 hp. Such engines require about 200 grams of fuel per hour. By using such an engine the entire apparatus is substantially independent of separate power supply devices, especially because the very small quantities of fuel required for such engines do not cause any problems in taking such small fuel quantities along. Instead of using an internal combustion engine, a small electric motor operated by a battery or by a fuel cell may be employed. Where a battery is used a charger might be necessary, which again would require an internal combustion engine, especially where the apparatus is to be used over prolonged periods of time. In any event, a hand crank 26 may be used to drive the compressor 19 in an emergency.

The arrangement of the two chambers 11 and 12 back to back with the compressor and drive means for the compressor between the chambers results in an especially compact structure which may be incorporated in a back-pack, which thus becomes suitable for use in any type of surroundings.

Figure 3:
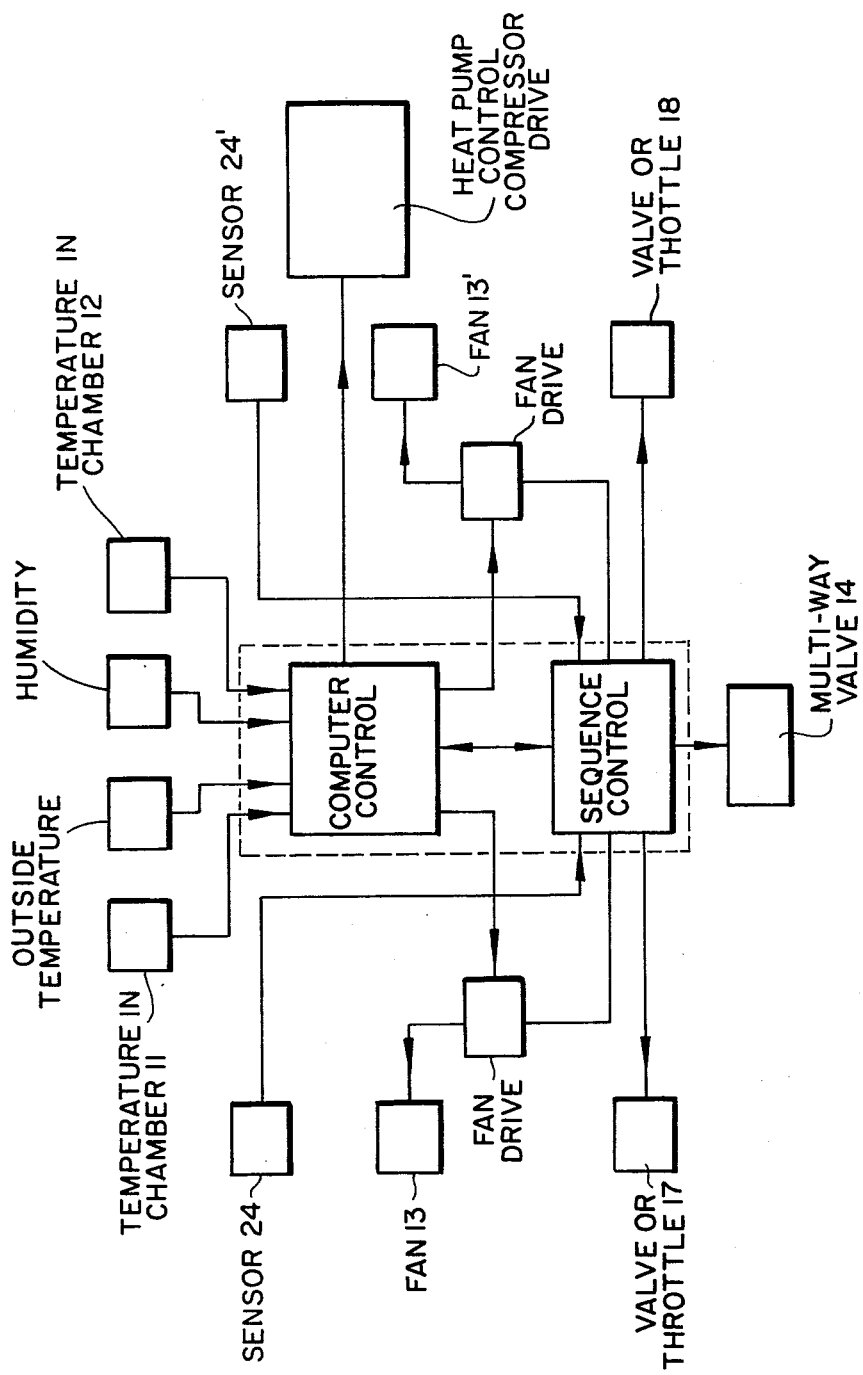
FIG. 3 shows a block diagram of the control circuit which may be employed in the operation of the apparatus illustrated in FIG. 1.

FIG. 3 illustrates in block form the control means 25 and the elements which are controlled by the control means. The control means 25 may include a computer and a sequence control. In FIG. 3 the computer receives input signals signifying the temperature in the chamber 11, the outside temperature, the humidity of the atmosphere and the temperature in the chamber 12. Such temperature and humidity sensing devices are well known in the art. The temperature from the chambers 11 and 12 provide signals corresponding in fact to the signals provided by the sensing means 24, 24', which, as described above, signify the ice build-up in the chambers 11 and 12. However, the sensors 24 and 24' are also used in the control apparatus of FIG. 3 to provide input signals to the sequence control which forms part of the control mechanism 25. The computer provides an output signal for the starting and stopping of the heat pump, more specifically for the starting and stopping of the compressor drive. Further, the computer provides timing signals for the fan drives of the fans 13 and 13'. These fan drives also receive signals from the sequence control, which in turn is responsive to the ice build-up as described above. The sequence control also provides drive signals for the valves or throttles 17, 18 and for the multi-way valve 14 alternately connecting the compressor heating side or the compressor cooling side to one or the other chamber 11 or 12. The computer and sequence control cooperate with each other to establish the timing decribed above with reference to FIG. 2. The logic circuits for the control of the simple functions here involved are well known in the art.

The operation of the apparatus may be summarized as follows. Outside air will be sucked into the chambers 11 and 12 through the inlet ports 30 and 31 through ducts with throttle devices 17 and 18. The chambers 11 and 12 are under reduced pressure to provide an expansion and cooling of one or the other chamber. In this embodiment the low pressure in the chambers 11 or 12 is established by exhaust fans.

In another embodiment the air is compressed by a compressor and supplied through the throttles 17 and 18 into the respective chamber where it is expanded and strongly cooled by utilizing the Joule-Thompson effect. The air is then cooled in the respective chamber which cooperates with the heat pump as a vaporizer to such an extent that the humidity of the air is extracted either in the form of drops or in the form of ice. The respective other chamber meanwhile serves as a heater which is being cooled by the expanding outside air.

Depending on the selected water level or ice deposit, as measured by sensors 24, 24', the heat pump 10 is then switched over by the multi-way valve 14 by means of the electronic control device 25, whereby one chamber is separated from the outside air by closing the respective throttle 17, or 18. If an ice build-up was present, for example, in the chamber 11, the heat pump 10 operates now as a liquifier for the ice to thaw the latter which may collect in the channels 21, 21'. Vibration or suction devices 16a, 16b, as well as filters 28 may be provided between the channels 21, 21' and the collecting trough 15 to facilitate the transport of the liquid from the channels 21, 21' into the trough 15. Simultaneously, further water extraction from the air is accomplished in the respective other chamber, for example, in chamber 12, by the ice formation on the vaporizer wall 22b. When the thawing in the chamber 11 is completed a switch-over signal is produced, as described above, and the valve 17 is opened, whereupon the outer air now transported into the chamber 11, cools the chamber 11 and new ice is formed on the wall 22a until the selected ice build-up in the chamber 12 results in a further switch-over signal. The sequence is repeated continuously and in the described cycles until the drive is switched off.

Although the invention has been described with reference to specific example embodiments, it is to be understood, that it is intended to cover all modifications and equivalents within the scope of the appended claims.

What is claimed is:

1. An apparatus for extracting water from the atmosphere, comprising a heat pump including a compressor, drive means operatively connected to said compressor of the heat pump, chamber means including inlet ports, valve means connecting said chamber means to said heat pump at the heat withdrawing low pressure side thereof, suction means connected to said chamber means for transporting air therethrough, and means connected to said chamber means for withdrawing water from said chamber means, and wherein said chamber means comprise two separate chambers, said valve means comprising a multi-way valve connecting both chambers alternately to said heat pump in such a manner that heat is supplied to one chamber when heat is withdrawn from the other chamber and vice-versa, said apparatus further comprising control means, sensing means responsive to an operating condition in said chambers, said sensing means being operatively connected to said control means, said valve means being operatively connected to said control means whereby the operation of said valve means depends on the operating conditions in said chambers.

2. The apparatus according to claim 1, wherein said sensing means are responsive to an ice build-up in said chamber means.

3. The apparatus according to claim 1, wherein said water withdrawing means comprise a collecting trough, and means connecting said drip trough to said chamber means.

4. The apparatus according to claim 1, wherein said chamber means comprise reaction wall means, and means increasing the surface area of said wall means.

5. The apparatus according to claim 1, wherein said drive means comprise a hand operated crank member.

6. The apparatus according to claim 1, further comprising means arranged for effectively improving the consumption quality of the water by adding components such as minerals and/or vitamins to the water.

7. The apparatus according to claim 1, further comprising filter means arranged between said chamber means and said withdrawing means.

8. The apparatus according to claim 1, wherein the entire apparatus forms an integral structure in the form of a back-pack.

9. The apparatus according to claim 1, comprising further valve means in said inlet port means, and control means operatively connected to said further valve means for creating an expansion effect in said chamber means.

10. The apparatus according to claim 9, comprising sensor means in said chamber means and responsive to an operating condition in said chamber means, means connecting said sensor means to said control means, and wherein said first mentioned valve means are also operatively connected to said control means whereby said first mentioned valve means and said further valve means are operated by said control means.

* * * * *